UNITED STATES PATENT OFFICE.

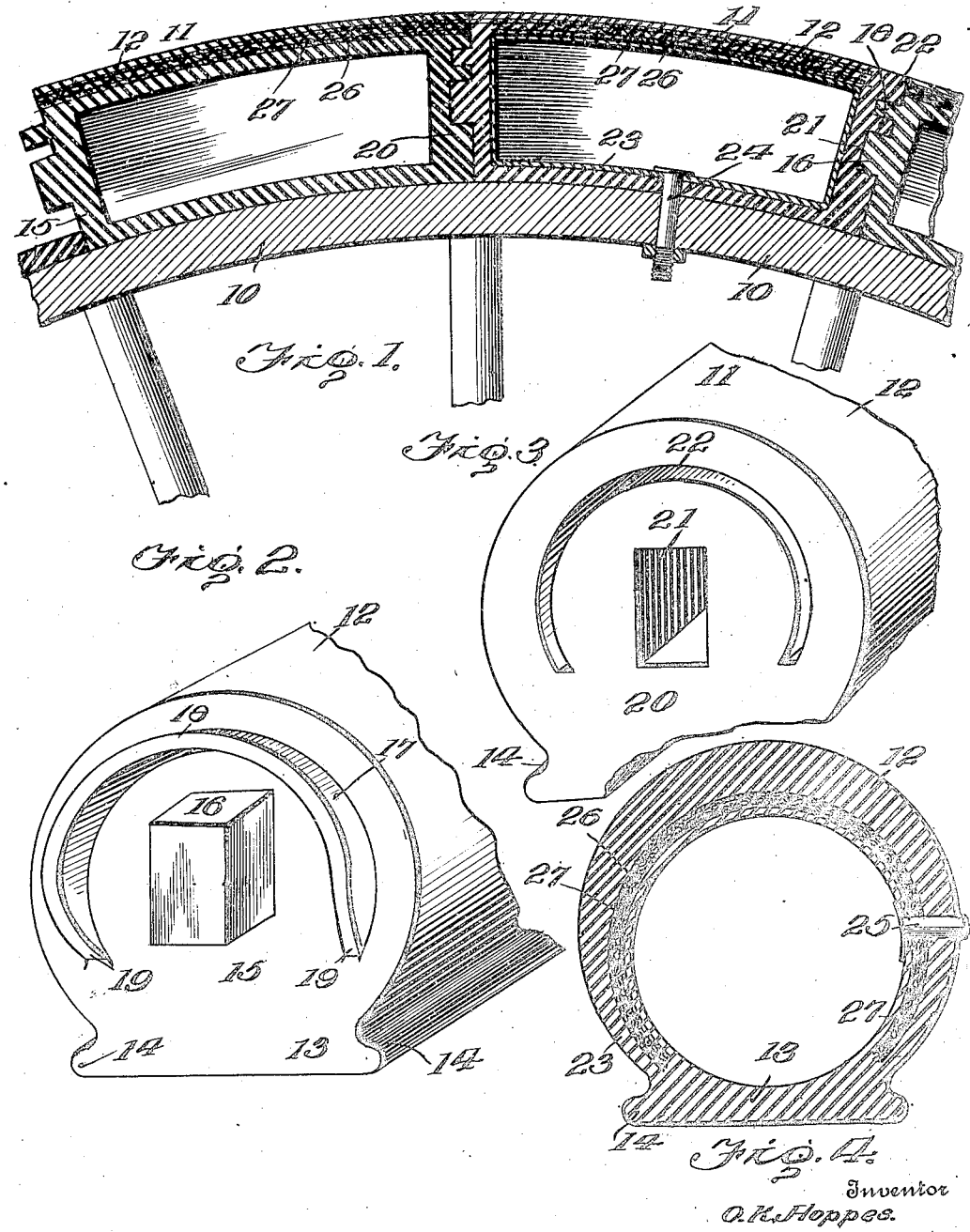

ODILLON K. HOPPES, OF TAMAQUA, PENNSYLVANIA.

PNEUMATIC TIRE.

1,115,430.  Specification of Letters Patent.  Patented Oct. 27, 1914.

Application filed March 5, 1913. Serial No. 752,143.

*To all whom it may concern:*

Be it known that I, ODILLON K. HOPPES, citizen of the United States, residing at Tamaqua, in the county of Schuylkill and State of Pennsylvania, have invented certain new and useful Improvements in Pneumatic Tires, of which the following is a specification.

This invention relates to an improvement in pneumatic tires for vehicle wheels.

The primary object of the invention is to provide a pneumatic tire formed in sections which are independently inflatable, the sections being so arranged that one section may be removed without disturbing the adjacent sections.

A further object of the invention is to provide the tire sections with interlocking means formed of rubber, whereby the sections may be quickly and conveniently brought into interlocking relation.

A still further object of the invention is to provide a sectional pneumatic tire in which each section will be independently protected from punctures and blowouts.

For a full understanding of the invention, reference is to be had to the following description and accompanying drawing, in which:

Figure 1 is a longitudinal section; Fig. 2 is a perspective view of one end of one of the tire sections; Fig. 3 is a perspective view of the other end; Fig. 4 is a transverse section.

Corresponding and like parts are referred to in the following description and indicated in all the views of the drawing by the same reference characters.

Broadly the invention contemplates the provision of a pneumatic tire formed of separate inflatable sections, and while the construction is intended for use with an inner casing, it may be dispensed with and the sections filled with air.

In the drawings, 10 designates the felly of the wheel which may be of any suitable construction. The sections 11 which are arranged on the felly are of a number consistent with the diameter of the wheel. Each of the sections in the construction illustrated consists of the casing 12 formed of rubber and curved longitudinally to conform to the curvature of the felly. The sections are provided with the base portion 13 which is formed with ribs 14, these ribs being engaged by any suitable demountable rim. The end walls 15 of the sections are provided with a substantially rectangular projection 16 which is disposed centrally of the end wall. A lip or rib 17 projects from the end wall and partially encircles the projection 16. This rib 17 tapers from its central portion 18 to its terminals 19. The opposite end wall 20 of each section is formed with a substantially rectangular recess 21 which conforms to the shape of the projection 16, and a curved groove 22 which conforms to the lip 17. Thus, it will be noted that each section is formed with what may be termed a male and female end. When the sections are assembled, the projection 16 and the lip 17 of one section will be received by the recess 21 and the groove 22 of the adjacent section, the sections interlocking and being effectually held against displacement.

When one of the sections has been punctured or in any way damaged and is deflated, it will be noted that this deflated section may be removed without disturbing the adjacent sections and readily replaced, the new section which is added being inserted in a deflated condition and inflated after it is brought into interlocking relation with the adjacent sections, the inflation of the sections maintaining them against displacement.

When the sections are provided with an inner casing, as illustrated at 23 in Fig. 1, each section is also provided with a valve 24 extending through the section and the felly, the sections when assembled being inflated in the same manner as when the air is forced directly into the casing. In this construction, the valves may be removed through the felly and the sections readily interchanged. Where the air is forced directly into the casing, each section is provided at one side with a valve 25, the sections being inflated through said valve.

The sections are preferably provided with the armor 26 formed of wire mesh, there being a layer of asbestos or other suitable material 27 on each side of the fabric which will prevent heating and destruction of the rubber of which the section is formed.

While this construction of armor has been illustrated, any form may be used or the sections formed without armors.

While the valves 24 are shown as extending through the rim, it will be noted that they may extend through the side of the casing as in the form shown in Fig. 3.

The many advantages of a construction of this character will be clearly apparent, as it will be noted that when any section of the tire is damaged it may be readily removed and replaced without disturbing the adjacent sections. It will also be noted that the entire construction is such as may be easily and economically manufactured and that the various parts may be readily assembled.

It will be noted that various changes may be made in the interlocking mechanism in order that it may conform to different rim constructions.

Having thus described my invention, what I claim as new and desire to secure by Letters Patent is:

A tire formed of a plurality of sections, each section at one end being provided with a projection substantially rectangular in cross section, and a substantially semi-circular rib partially embracing said projection, said rib tapering in height from its central portion to its terminals, the other end of each section being formed with a central recess and a semi-circular groove partially embracing said recess, said groove tapering in depth from its center to its terminals.

In testimony whereof I affix my signature in presence of two witnesses.

DR. ODILLON K. HOPPES. [L. S.]

Witnesses:
EDWARD F. KRANCH,
SAMUEL R. BEARD.